Patented May 27, 1952

2,598,263

UNITED STATES PATENT OFFICE 2,598,263

ESTERIFIED 4-VINYLCYCLOHEXENE

Herbert L. Johnson, Media, Pa., and Frances J. Bondhus, Oskaloosa, Iowa, assignors to Sun Oil Company, Philadelphia, Pa., a corporation of New Jersey No Drawing. Application October 6, 1947, Serial No. 778,270

3 Claims. (Cl. 260—476)

This invention relates to a process for the esterification of 4-vinylcyclohexene and to the esters formed by said process.

This application is a continuation-in-part of application Serial No. 636,510, now abandoned, filed December 21, 1945 by the instant inventors.

According to the invention novel compounds are prepared by esterifying 4-vinylcyclohexene under conditions hereinafter described.

The acids which may be employed in this esterification process are low molecular weight aliphatic acids, having from 1–5 carbon atoms per molecule, formic, acetic, propionic, butyric and valeric acids, aromatic acids such as benzoic and toluic acids; alpha-halo-substituted or alpha-hydroxy-substituted aliphatic acids, having from 1–5 carbon atoms per molecule, such as the chloroacetic acids, and lactic acid. Other acids closely related to those specifically mentioned above may be employed in the esterification process to obtain various ester derivatives of 4-vinylcyclohexene.

Catalysts that may be used for this process are of the acid type, for example, sulfuric acid, boron trifluoride, boron trifluoride ether complex, stannic chloride and ferric chloride.

The temperature during the reaction is maintained within the range 75° C.–130° C.

The following examples will serve to illustrate the invention:

Example 1

The acetate of 4-vinylcyclohexene was prepared by dissolving 162 grams of 4-vinylcyclohexene in 500 grams of glacial acetic acid to which 12 grams of water had been added. This solution was treated with 8 grams of 98% sulfuric acid, with stirring, at about 100° C. for 12 hours. From the reaction mass there was separated 34.4% of esterified 4-vinylcyclohexene based upon the 4-vinylcyclohexene charged to the reaction. The major portion of this product was a colorless liquid, with a pleasant odor. It had a boiling temperature of 210° C.–211° C. (uncorrected) at 765 mm. Hg. The theoretical carbon-hydrogen for the formula $C_{10}H_{16}O_2$, the formula of the ester prepared is C=71.38%; H=9.59%. The experimentally determined values found were C=71.58%; H=9.61%. During the distillation of the mono-acetate derivative through a Widmer Column various cuts taken showed little variation in refractive index or boiling point. The refractive index of the major portion of the product was found to be $n_D^{20}$ 1.4585.

In addition to the mono-acetate there was obtained a higher boiling fraction consisting of the diacetate of 4-vinylcyclohexene and polymer.

Example 2

The butyrate of 4-vinylcyclohexene was prepared by adding 8 grams of 95% concentrated sulfuric acid to 176.2 grams of butyric acid. The mixture was heated to 100° C. and 108 grams of 4-vinylcyclohexene was added over a period of 1 hour and the reaction mass was heated at the same temperature for an additional five hours. The yield of monobutyrate was 27.9% while 44.2% of unreacted 4-vinylcyclohexene was recovered. The remainder was a mixture of the dibutyrate of 4-vinylcyclohexene and polymer. The theoretical carbon-hydrogen for the monobutyrate is C=73.43%; H=10.20%. The experimentally determined values were C=73.44% and H=10.27%. The refractive index of this compound was $n_D^{20}$ 1.4570. Boiling range 55° C.–56° C. at 0.2 mm. Hg pressure.

Example 3

The benzoate of 4-vinylcyclohexene was prepared by adding 108 grams of 4-vinylcyclohexene to a mixture of 244 g. of benzoic acid and 11 grams of 95% sulfuric acid at 125° C. over a period of 1 hour. Heating was continued for an additional three hours. The yield of mono-benzoate was 11.0%, while 6.0% of di-benzoate and polymer was formed. The remainder of the 4-vinylcyclohexene charged to the reaction was recovered unreacted. The mono-benzoate had a strong ester like odor and distilled at 135° C.–145° C. at 5 mm. Hg pressure.

Example 4

The mono-chloroacetate of 4-vinylcyclohexene was prepared by dissolving 21.3 grams of boron trifluoride diethyl ether complex in 94.5 grams of mono-chloroacetic acid and 250 ml. of chloroform. To this mixture at 50° C. was added dropwise 108 grams of 4-vinylcyclohexene over a period of 65 minutes. The mixture was heated at the same temperatures for an additional three hours and was allowed to stand overnight at room temperatures, before the reaction mixture was separated. The yield of the mono-chloroacetate was 30.6%. The bismino-chloroacetate of 4-vinylcyclohexene and polymer yield was 25.0% while the unreacted 4-vinylcyclohexene was 36.5%. The mono-chloroacetate of 4-vinylcyclohexene was characterized by a boiling range of 64° C.–65° C. at 0.25 mm. Hg, $n_D^{20}$ 1.4816. The calculated chlorine analysis was Cl=17.50%

Example 5

The lactate of 4-vinylcyclohexene was prepared by adding 216 grams of 4-vinylcyclohexene dropwise to a mixture of 214 grams of 85% lactic acid and 25.5 grams of 95% sulfuric acid at a temperature of 100° C. over a period of 2 hours. The reaction mixture was heated for an additional 4 hours before working up. The yield of the mono-lactate was 20.3%. Yield of di-lactate and polymer was 27.7%. The remaining 4-vinylcyclohexene was recovered unreacted. The mono-lactate is characterized by having a boiling range of 79° C.–80° C. at 0.4 mm. Hg and a refractive index $n_D^{20}$ 1.4795.

4-vinylcyclohexene has two points of unsaturation in the molecule and it is not possible to predict with certainty which of the two double bonds will be first to react. We have obtained conclusive proof that a substantial portion of the mono-ester formed enters the ring in the 1-position. This proof is based upon a comparison of the alpha-naphthyl urethane prepared from the ethyl cyclohexanol produced by reduction of the unsaturated alcohol obtained by saponification of the mono-acetate of 4-vinylcyclohexane. The alpha-naphthyl urethane of 4-ethylcyclohexanol (as recorded in the literature) has a melting point of 139.5–140.5° C. which corresponds exactly to that obtained for the same derivative prepared from our unknown compound. The alpha-naphthyl urethane of 3-ethylcyclohexanol melts at 98.5–99.5° C. Therefore it is believed that the major portion of the mono-esters of 4-vinylcyclohexene are 4-vinylcyclohexyl acylates. The di-esters are therefore believed to have an ester group attached in the 1-position and a second ester group attached in the side chain on the carbon atom alpha to the cyclohexene ring.

The ester products of this invention are suitable for use as starting materials in the preparation of an alcohol of 4-vinylcyclohexene which is described and claimed in copending application Serial No. 641,643, filed January 16, 1946, now Patent No. 2,513,179, by the instant inventors. These esters are also useful chemical intermediates for further synthesis.

The foregoing has been written for disclosure purposes and it will be obvious to those skilled in the art that variation is possible within the scope of the invention.

We claim:

1. The ester of 4-vinylcyclohexene wherein the ester radical is selected from the group consisting of the acetate, propionate, butyrate, valerate, the alpha-halo and alpha-hydroxy substituted derivatives thereof, benzoate and toluate radicals, and wherein said ester radical is attached to the 4-vinylcyclohexene molecule in the 1-position of the 4-vinylcyclohexene.

2. 4-vinylcyclohexylacetate.

3. Process for the preparation of a mono-ester of 4-vinylcyclohexene wherein the ester radical is attached to the 1-position of the cyclohexene ring which comprises reacting 4-vinylcyclohexene with an acid selected from the group consisting of acetic, propionic, butyric, and valeric acids, the alpha-halo and alpha-hydroxy substituted derivatives thereof, benzoic acid and toluic acid, in the presence of an acid type catalyst, said reaction being carried out at a temperature within the range of from 75° C. to 130° C., and separating from the reaction mixture said mono-ester of 4-vinylcyclohexene wherein the ester radical is attached to the 1-position of the cyclohexene ring.

HERBERT L. JOHNSON.
FRANCES J. BONDHUS.

REFERENCES CITED

The following references are of record in the file of this patent:

UNITED STATES PATENTS

| Number | Name | Date |
|---|---|---|
| 2,198,046 | Vierling | Aug. 23, 1940 |

OTHER REFERENCES

Cook et al.: "Journ. Chem. Soc.," (London 1935) I, pp. 500–502.

Cook et al.: "Journ. Chem. Soc.," (London 1938) p. 61.

Lindemann et al.: "Annalen der chemie.," vol. 477 (1929), p. 89.

Nenitzescu et al.: "Berichte Deutch Chem. Gessell.," vol. 7413 (1941), p. 683.

Sievers: Chemical Abstracts, vol. 6, p. 1655 (1912) (citing U. of Wisc. Bull. 434 (Sci. Series), 1911, 4, No. 3, pp. 39–80, 1911).